(12) United States Patent
Gusyev et al.

(10) Patent No.: US 11,850,949 B2
(45) Date of Patent: Dec. 26, 2023

(54) DEVICE FOR CALIBRATING TWO ELECTRIC MOTORS MOUNTED ON ONE AXLE IN TWO-AXLE MOTOR VEHICLES

(71) Applicant: Bayerische Motoren Werke Aktiengesellschaft, Munich (DE)

(72) Inventors: Igor Gusyev, Munich (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 256 days.

(21) Appl. No.: 17/296,430

(22) PCT Filed: Dec. 11, 2019

(86) PCT No.: PCT/EP2019/084536
§ 371 (c)(1),
(2) Date: May 24, 2021

(87) PCT Pub. No.: WO2020/143978
PCT Pub. Date: Jul. 16, 2020

(65) Prior Publication Data
US 2022/0009356 A1    Jan. 13, 2022

(30) Foreign Application Priority Data
Jan. 8, 2019   (DE) .................... 10 2019 100 324.5

(51) Int. Cl.
*B60L 15/20*   (2006.01)
(52) U.S. Cl.
CPC ....... *B60L 15/2036* (2013.01); *B60L 2220/42* (2013.01); *B60L 2220/46* (2013.01);
(Continued)

(58) Field of Classification Search
CPC ............. B60L 15/2036; B60L 2220/42; B60L 2220/46; B60L 2240/12; B60L 2240/22;
(Continued)

(56) References Cited

U.S. PATENT DOCUMENTS

2003/0079924 A1    5/2003  Wakitani et al.
2004/0204803 A1*  10/2004  Matsuda ................. B60L 50/11
                                                                  903/906
(Continued)

FOREIGN PATENT DOCUMENTS

CN          102271980 A      12/2011
CN          102712247 A      10/2012
(Continued)

OTHER PUBLICATIONS

International Search Report (PCT/ISA/210) issued in PCT Application No. PCT/EP2019/084536 dated Mar. 23, 2020 with English translation (six (6) pages).
(Continued)

*Primary Examiner* — James M McPherson
*Assistant Examiner* — Kyle J Kingsland
(74) *Attorney, Agent, or Firm* — Crowell & Moring LLP

(57) ABSTRACT

A device for calibrating two electric motors mounted on one axle in two-axle motor vehicles includes at least one electronic control unit configured to check whether predefined conditions for a switchover from torque control to rotational speed control are met. If met, the at least one electronic control unit is configured to switch to rotational speed control for a predefined period of time. A torque-dependent characteristic map with correction values is created on the basis of this difference. The target torques are corrected by the correction values during torque control after rotational speed control has been deactivated.

9 Claims, 1 Drawing Sheet

(52) U.S. Cl.
CPC ....... *B60L 2240/12* (2013.01); *B60L 2240/22* (2013.01); *B60L 2240/24* (2013.01); *B60L 2240/421* (2013.01); *B60L 2240/423* (2013.01); *B60L 2240/461* (2013.01); *B60L 2240/80* (2013.01); *B60L 2260/42* (2013.01); *B60L 2260/46* (2013.01)

(58) Field of Classification Search
CPC ........... B60L 2240/24; B60L 2240/421; B60L 2240/423; B60L 2240/461; B60L 2240/80; B60L 2260/42; B60L 2260/46; B60L 15/20; B60W 2050/0088; B60W 10/08; B60W 2720/406
See application file for complete search history.

(56) References Cited

U.S. PATENT DOCUMENTS

| | | | |
|---|---|---|---|
| 2008/0264709 | A1 | 10/2008 | Fenker et al. |
| 2012/0035820 | A1 | 2/2012 | Falkenstein |
| 2013/0138284 | A1 | 5/2013 | Kruse et al. |
| 2016/0090004 | A1 | 3/2016 | Ienaga |
| 2016/0176313 | A1* | 6/2016 | Li .......................... B60L 50/51 701/22 |
| 2018/0257651 | A1* | 9/2018 | Kitagawa ............ B60W 30/188 |
| 2019/0232799 | A1* | 8/2019 | Hirata ................. B60L 15/2036 |

FOREIGN PATENT DOCUMENTS

| | | |
|---|---|---|
| CN | 105459848 A | 4/2016 |
| CN | 105555590 A | 5/2016 |
| CN | 106080605 A | 11/2016 |
| CN | 206049409 U | 3/2017 |
| CN | 108437978 A | 8/2018 |
| CN | 108790939 A | 11/2018 |
| DE | 102 49 639 A1 | 7/2003 |
| DE | 10 2007 017 821 A1 | 10/2008 |
| DE | 10 2010 012 153 A1 | 9/2011 |
| EP | 1 426 222 A1 | 6/2004 |
| EP | 2 368 746 A2 | 9/2011 |
| EP | 3 042 800 A1 | 7/2016 |
| JP | 9-233613 A | 9/1997 |
| JP | 2003-200746 A | 7/2003 |
| JP | 2006-256454 A | 9/2006 |
| JP | 2011-130629 A | 6/2011 |
| JP | 2013-74769 A | 4/2013 |
| WO | WO 2011/116852 A1 | 9/2011 |
| WO | WO 2015/002033 A1 | 1/2015 |
| WO | WO 2016/043077 A1 | 3/2016 |
| WO | WO 2018/162191 A1 | 9/2018 |

OTHER PUBLICATIONS

German-language Written Opinion (PCT/ISA/237) issued in PCT Application No. PCT/EP2019/084536 dated Mar. 23, 2020 (nine (9) pages).

German-language Search Report issued in German Application No. 10 2019 100 324.5 dated Jul. 29, 2019 with partial English translation (14 pages).

Chinese-language Office Action issued in Chinese Application No. 201980069688.X dated May 11, 2023 with English translation (18 pages).

Chinese-language Office Action issued in Chinese Application No. 201980069688.X dated Aug. 17, 2023 with English translation (18 pages).

* cited by examiner

DEVICE FOR CALIBRATING TWO ELECTRIC MOTORS MOUNTED ON ONE AXLE IN TWO-AXLE MOTOR VEHICLES

BACKGROUND

This disclosure relates to a device for calibrating two electric motors mounted on one axle in two-axle motor vehicles, in particular electric vehicles or hybrid vehicles.

Individual wheel drives are increasingly being used in vehicles that have at least one electrically driven axle. Among the advantages of the individual wheel drive is the possibility of implementing wheel-specific distribution of the drive torque. The omission of a differential means that the torque can be distributed equally or with a selective difference between the two wheels of the axle that has electric individual wheel drive, depending on the desired longitudinal and transverse acceleration of the vehicle.

This flexibility also entails high demands on the accuracy of the output torque of two completely or partially independent electric drives or drive motors. Excessive deviation of the torques from the respective target value can have a negative effect on the driving dynamics. The driver would have to compensate by significant countersteering when driving straight ahead. Above a certain threshold, the driving behavior of the vehicle is no longer acceptable.

SUMMARY

One of the objects of this disclosure is that of providing simple calibration to compensate for differences in torques.

According to this disclosure, this and other objects are achieved by the inventive device according to the disclosure for calibrating two electric motors mounted on one axle in two-axle motor vehicles having at least one electronic control unit, the following steps are carried out while the vehicle is in motion. In a first step, the system checks whether predefined conditions for a switchover from torque control to rotational speed control are met, and if this is the case, a switchover to rotational speed control is made for a predefined period of time. During the predefined period of time, in a second step, which is carried out during the period of time in which rotational speed control is active, the target torques of the two electric motors are acquired and stored, and a difference is formed between the acquired target torques of the two electric motors, wherein a torque-dependent characteristic map with correction values is created on the basis of this difference. After rotational speed control has been deactivated, the target torques are corrected by the correction values during torque control.

Normally, the torque is not measured and controlled directly, but is determined indirectly via current and rotor position measurements and models of the electric drive. The sensor system required for this is subject to production-related but also age-related variation. In addition, further parameters of the electric drive or drive motor can vary as a result of production and can additionally be changed by faults in operation.

By avoiding unacceptable torque differences on the basis of calibration of the electric motors while driving, to be more precise as soon as predefined conditions are met, unstable driving behavior caused by different torques or rotational speed can be prevented. The calibration process takes place during rotational speed control, and therefore a temporary switchover from torque control (standard control) to rotational speed control is required.

Measures according to this disclosure:
1: Switching to rotational speed control for a predefined short period of time under predefined conditions while the vehicle is in motion While the vehicle is in motion, a control device checks whether certain conditions for a switchover are met. The conditions to be met are:

The rotational speeds of both electric motors are the same, which is the case, for example, when driving straight ahead without slip, i.e. Nist EM1=Nist EM2

The vehicle speed is below a maximum permitted vehicle speed of, for example, 30 km/h or less. The vehicle speed can be determined from the rotational speed of the electric motors N. It must therefore be the case that N≤Nmax, wherein Nmax can be converted to the vehicle speed. The maximum vehicle speed Nmax can be specified by a person skilled in the art according to the electric motors used or other conditions.

The steering wheel is in a straight position or within a tolerance range of, for example, ±2 degrees thereof, wherein the tolerance range can likewise be specified by a person skilled in the art. The straight position can be supported, for example, by means present in the vehicle, e.g. "steer by wire".

The yaw rate, i.e. the rotational speed of the vehicle about the Z-axis, must not exceed a predefined value N_z_max. This value too can be chosen by a person skilled in the art according to the application and should be as low as possible.

2: Correction of the rotational speed difference via torque correction

If the preconditions for switching on rotational speed control are met, rotational speed control is activated for a predefined, short time $\Delta t$. This time $\Delta t$, in turn, can be chosen by a person skilled in the art according to the application and should be within a few seconds.

A value close to the current actual rotational speed should be selected as the target rotational speed value Nsoll for the two rotational speed controllers of the electric motors EM1 and EM2 in order to ensure the smoothest possible running without severe braking or acceleration and thus to keep control simple. The possible deviation, i.e. the exact value, can once again be selected by a person skilled in the art according to the application. A prerequisite for correction is that the rotational speed controllers for the two electric motors EM1 and EM2 are always active. The torque is then determined from the rotational speed. The rotational speed controllers automatically set the target torques in such a way that the actual rotational speed remains the same in both electric machines EM1 and EM2. In the case of full symmetry between the two electric machines EM1 and EM2, i.e. there is no parameter spread, etc., the target torques, i.e. the output signals of the rotational speed controllers, would also be the same since the outputs of the rotational speed controllers represent the target torques for each electric machine. An inequality of target torques indicates an asymmetry in an electric machine. In this case, the target torques should be corrected when switching to torque control. For correction, the deviation of the two target torques, i.e. the output signals of the rotational speed controllers when rotational speed control is activated, is used.

In order to carry out the calibration, the outputs from the two rotational speed controllers of the two electric motors EM1 and EM2, i.e. Msoll_EM_N_Regler and Msoll_EM_N_Regler, are stored in the control device 1.

In addition, a difference is formed between these target torques from the two rotational speed controllers of the electric motors EM1 and EM2:

$$\Delta Msoll = Msoll\_EM1\_N\_Regler - Msoll\_EM2\_N\_Regler$$

If there is a difference between the rotational speed controllers, this indicates an accuracy spread of the sensor system and/or of the structural components, which should be corrected.

On the basis of a plurality of stored target torque values, a torque-dependent characteristic map or a characteristic curve with correction values ΔMsoll(Msoll) is created during the rotational speed control phase. Here, correction values for the target torques Msoll are stored for each electric motor EM1 or EM2 and used for correction after rotational speed control has been deactivated, i.e. during torque control.

During torque control, the correction values ΔAMsoll (Msoll) stored in the characteristic map are added continuously to the target torque values for torque control Msoll_EM1 and Msoll_EM2 in order to compensate for the accuracy spread of the hardware.

Once the period of time Δt has passed, i.e. when a switch back from rotational speed control to torque control is made, the compilation of correction values which has been described is also ended, since the calibration is thus also finished.

Furthermore, the frequency of activation of calibration can be limited. Activation can be limited, for example, to activation within a predefined period of time, e.g. one day. Since the correction characteristic map should also be torque-dependent, rotational speed control must be activated at various target torques. Activation once a day, e.g. when the engine is cold and when it is hot, would be sufficient in a first step. However, activation can only take place if the activation conditions are met.

This disclosure in the form of a concept for calibrating the target torque deviation between two individually driven wheels in the motor vehicle, i.e. with two electric motors on one axle, offers a possibility for cost-effective handling of torque differences in vehicles with electric individual wheel drive without expensive sensors and production methods. It offers the possibility of carrying out the defined calibration according to the disclosure during the operation of the vehicle and thus of preventing destabilization of the driving behavior due to deviations of the target torques of the two electric motors.

Other objects, advantages and novel features of the present invention will become apparent from the following detailed description of one or more preferred embodiments when considered in conjunction with the accompanying drawings, in which:

DETAILED DESCRIPTION OF THE DRAWINGS

Figure 1:
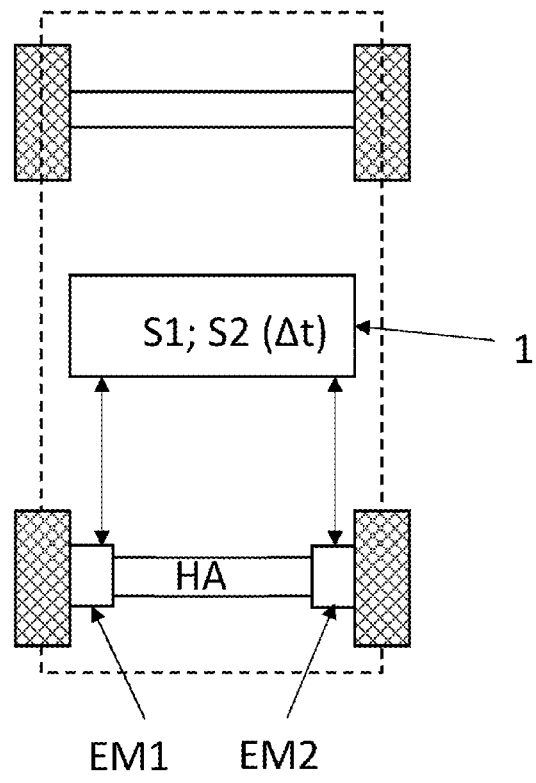
FIG. 1 shows, in a schematic illustration, an overview of the components of the invention in a single-axle drive.
Figure 2:
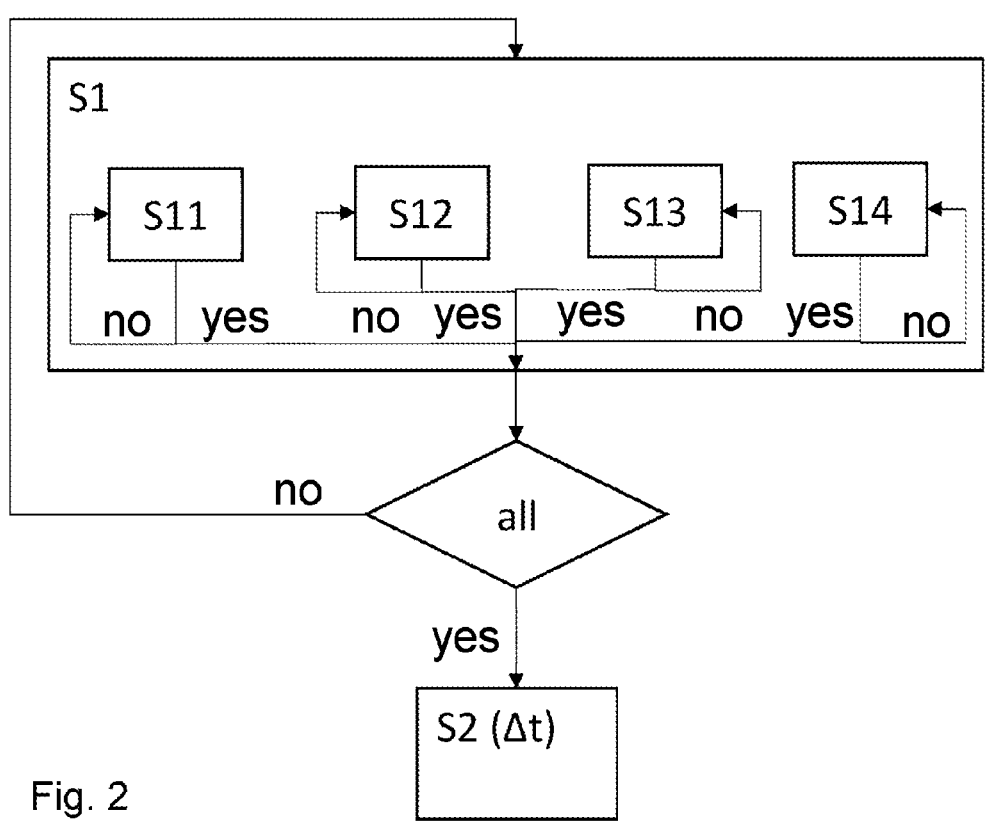
FIG. 2 is a flowchart of the calibration.

FIG. 1 illustrates a vehicle with single-axle drive having a first, left-hand electric motor EM1 for individual wheel drive on the rear axle HA, and having a second, right-hand electric motor EM2 for individual wheel drive on the rear axle HA. Alternatively, it is also possible for a vehicle driven via the front axle or an all-wheel drive vehicle to be provided with the invention since said invention is directed to two electric motors EM1 and EM2 arranged on one axle, irrespective of the position on the vehicle. The vehicle according to FIG. 1 represents a road-coupled hybrid or electric vehicle. The vehicle has at least one electronic control unit 1, in particular as or in an engine control device. The control unit 1 is configured in such a way, by means of a correspondingly programmed function module (computer program product) for example, that the following method according to the invention, which is represented in FIG. 2 as a flowchart, can be carried out therewith while driving:

In a first step S1, the control device 1 checks whether switching to rotational speed control is possible for a predefined, short period of time under predefined conditions while the vehicle is in motion.

The conditions to be met are:

S11: the currently detected rotational speeds of both electric motors EM1 and EM2 are the same, which is the case when driving straight ahead without slip, i.e. Nist_EM1=Nist_EM2

S12: the vehicle speed is below a maximum permitted vehicle speed of, for example, 30 km/h or less. The vehicle speed can be determined from the rotational speed N of the electric motors EM1 and EM2. It must therefore be the case that N≤Nmax, wherein Nmax can be determined from the vehicle speed and vice versa. The maximum vehicle speed can be specified by a person skilled in the art according to the electric motors EM1 and EM2 used or other conditions.

S13: the steering wheel is in a straight position or within a tolerance range of, for example, ±2 degrees, wherein the tolerance range can likewise be specified by a person skilled in the art. The straight position can be supported, for example, by means present in the vehicle, e.g. "steer by wire".

S14: the yaw rate, that is to say the vehicle rotational speed about the Z-axis, must not exceed a predefined value N_z_max. This value too can be chosen by a person skilled in the art according to the application and should be as low as possible.

If all conditions are met (yes), the second step S2, namely the actual calibration, is carried out. For this purpose, rotational speed control is activated for a predefined, short time Δt. During this time Δt, the difference between the target torque of the first electric motor and the target torque of the second electric motor is determined:

$$\Delta Msoll = Msoll\_EM1\_N\_Regler - Msoll\_EM2\_N\_Regler$$

On the basis of the difference values, a characteristic map or a characteristic curve is created, which specifies correction values ΔMsoll(Msoll) based on current target torques. After this, calibration is complete and it is possible to switch back to torque control. During torque control, the correction values ΔMsoll(Msoll) are respectively added to the target torques of the two electric motors MSoll_EM1 and MSoll_EM2.

If one of the conditions is not met (no), then step S1 is carried out again, i.e. rotational speed control and thus calibration are not activated until all conditions S11-S14 are met again.

What is claimed is:

1. A device for calibrating two electric motors mounted on one axle in two-axle motor vehicles comprising:
    at least one electronic control unit, wherein while the vehicle is in motion the at least one control unit is configured to perform the following, when predefined conditions for a switchover from torque control to rotational speed control are met:

switch to rotational speed control for a predefined period of time; and during the period of time in which rotational speed control is active:

acquire and save the target torques of the two electric motors, and form a difference between the acquired target torques of the two electric motors, wherein a torque-dependent characteristic map with correction values is created on the basis of this difference, and the target torques are corrected by the correction values during torque control after rotational speed control has been deactivated.

2. The device according to claim 1, wherein the conditions met include at least one of the following:

that the current rotational speeds of both electric motors are the same, that the vehicle speed is less than a predefined vehicle speed, that the steering wheel is in a straight position or within a predefined tolerance range, and that the yaw rate of the vehicle is within a predefined range of values.

3. The device according to claim 2, wherein the vehicle speed is determined by the rotational speed of the electric motors.

4. The device according to claim 3, wherein a value close to the current actual rotational speed is selected as the target rotational speed value for the two rotational speed controllers of the electric motors, wherein the value close to the current actual rotational speed is selected such that the rotational speed controllers for the electric motors are always active.

5. The device according to claim 4, wherein the target torques of the electric motors are output from the rotational speed controllers of the electric motors.

6. The device according to claim 5, wherein a torque-dependent characteristic map or a characteristic curve with correction values is created from previously stored target torque values, wherein the correction values are added to the target torque values of the torque control during the period of time of torque control.

7. The device according to claim 6, wherein a frequency of activation of calibration is limited to activation within a predefined period of time.

8. A method for calibrating two electric motors mounted on one axle in two-axle motor vehicles having at least one electronic control unit, the method comprising:

while the vehicle is in motion, perform the following, when checking whether predefined conditions for a switchover from torque control to rotational speed control are met:

switching to rotational speed control for a predefined period of time, while the vehicle is in motion, and during the period of time in which rotational speed control is active:

acquiring and saving the target torques; and forming a difference between the acquired target torques of the two electric motors, wherein a torque-dependent characteristic map with correction values is created on the basis of this difference, wherein the target torques are corrected by the correction values during torque control after rotational speed control has been deactivated.

9. The method according to claim 8, wherein the method is executed by a non-transitory computer readable storage medium storing a program.

* * * * *